Oct. 26, 1965    H. J. GILL    3,214,218
SAFETY BELT FOR AUTOMOBILES
Filed July 23, 1962
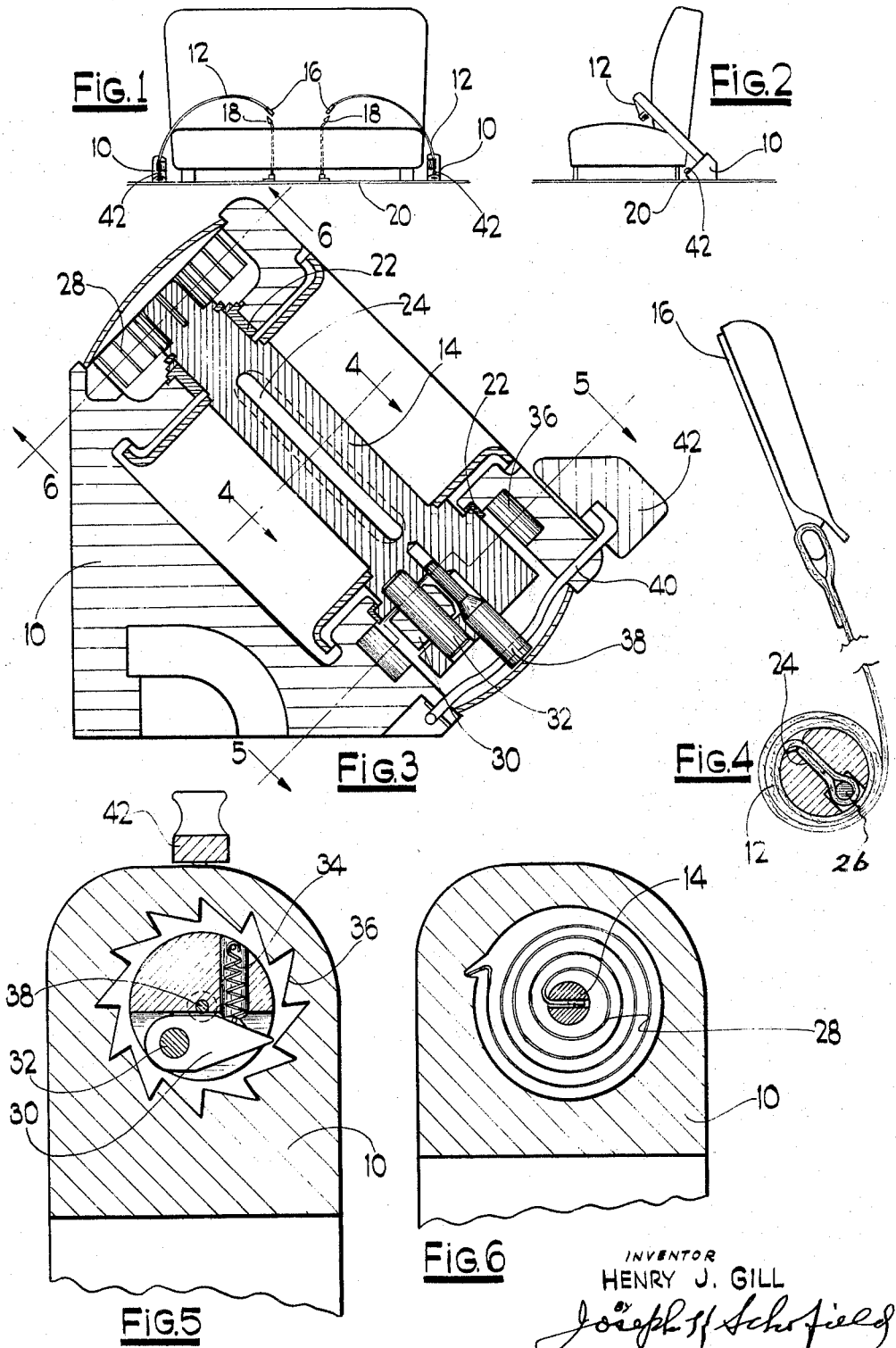
INVENTOR
HENRY J. GILL
BY
Joseph H. Schofield
ATTORNEY

United States Patent Office 3,214,218
Patented Oct. 26, 1965

3,214,218
SAFETY BELT FOR AUTOMOBILES
Henry J. Gill, Thomaston, Conn., assignor to Defco, Inc., Litchfield, Conn., a corporation of Connecticut
Filed July 23, 1962, Ser. No. 211,915
1 Claim. (Cl. 297—388)

This invention relates to safety belts and more particularly to a safety belt having one end attached to a housing member secured to the floor of an automobile and adapted when extended to be fastened about a seated passenger and having its opposite end suitably but detachably attached to another belt section, said other belt section having its opposite end attached directly to the automobile.

An object of primary importance of the invention is that the belt when extended and in use is automatically locked against further extension in the event forward motion of the vehicle is suddenly reduced or stopped.

Another object of importance of the invention is that the belt may be manually locked against further extension from any adjusted operative position.

Another object of the invention is to provide means to resiliently return the belt to its retracted or inoperative position when not in use and released.

And finally it is an object of the invention to provide a convenient, efficient safety belt that may be attached to any type of passenger automobile, be ready for use at any time, and will be out of the way when not in use.

With the above and other objects in view the invention may include the features of construction and operation set forth in the following specification and illustrated in the accompanying drawing.

In the accompanying drawing annexed hereto and forming a part of this specification, I have shown the invention embodied in a unit adapted for a standard passenger automobile but it will be understood that the invention can be otherwise embodied, and that the drawing is not to be construed as defining or limiting the scope of the invention, the claim appended to this specification being relied upon for that purpose.

In the drawings:

FIGS. 1 and 2 are, respectively, front and side views of the present form of safety belt shown in position relative to the seat of an automobile;

FIG. 3 is a longitudinal central section of the housing and enclosed operating parts for one portion of a safety belt;

FIG. 4 is a sectional view taken on the plane of line 4—4 in FIG. 3 and showing a belt attached to the reel;

FIG. 5 is a sectional view taken on the planes of broken line 5—5 in FIG. 3, and showing the locking pawl in its retracted position;

FIG. 6 is a sectional view taken on the plane of line 6—6 in FIG. 3, showing the belt rewinding spring.

In the above mentioned drawing, there has been shown but one embodiment of the invention which is now deemed preferable, but it is to be understood that changes and modifications may be made within the scope of the appended claims without departing from the spirit of the invention.

Referring more in detail to the figures of the drawing and first to FIGS. 1 and 2 it will be seen that the safety belt provided for each passenger includes a housing 10 within which one end of a belt 12 is attached to a rotatably mounted arbor or shaft 14. The opposite or free end of this belt 12 is privided with a buckle 16 attachable to one end of a short belt section 18 having its opposite end attached to a fixed part of the vehicle spaced from the housing 10.

The housing 10 is attached securely to a fixed part of the vehicle preferably to one of the floor members 20 below and slightly behind the seat for which it is designed. Within the housing 10 and disposed between suitable bearings 22 is the rotatably mounted arbor 14 to which one end of an elongated belt or strap section 12 is attached as shown in FIG. 4.

For that purpose the central portion of the arbor 14 between the bearings 22 therefor is provided with a slot or transverse opening 24 through which the looped end of the belt portion 12 may extend. When this end of the belt 12 has been passed through the slot 24 a pin 26 is passed through the looped belt end. When the belt 12 is drawn tightly the pin 26 rests within a slightly widened portion of the slot 24 and prevents the belt from being withdrawn from the arbor.

At one end of the arbor 14 a spirally wound spring 28 has its inner end attached to the arbor, the outer end of the spring being suitably attached to the housing 10. Withdrawing the belt 12 from the arbor 14 winds up the spring 28 so that when released the belt 12 is retracted and again wound about the arbor 14 within the housing 10.

Adjacent the opposite end of the arbor 14 is a pivotally mounted pawl member 30, its pivot comprising a pin 32 mounted within bearings therefor in the arbor. The pin 32 as shown in the figures of the drawing has its axis parallel to the axis of rotation of the arbor 14 so that the pawl may swing radially outward. To normally restrain outward radial oscillation of the pawl 30 a light spring 34 housed within the arbor has its inner end attached to a portion of the pawl as shown in FIG. 3. The outer end of spring 34 is attached to a pin housed within the arbor 14.

It will be seen from an inspection of the figures of the drawing that the greater part of the weight of the pawl 30 is on one side of its pivot 32. This weighted end of the pawl 30 is its pointed end which, when the arbor 14 is rapidly rotated by a sudden pull on the belt, centrifugally forces the point of the pawl 30 radially outward. In this outer position of the pointed end of the pawl 30 engagement is made with any one of a series of ratchet teeth 36 formed within the housing 10.

Preferably these teeth 36 are integral with the body of the housing 10 by being cast directly therein and are disposed in an annular series concentric to the axis of the arbor 14. With the point of the pawl in engagement with one of the ratchet teeth 36 further withdrawal of the belt 12 is prevented. This action of automatically locking the belt 12 against further withdrawal takes place promptly when the belt is attempted to be quickly withdrawn. This is due to the centrifugal action on the pawl when the arbor is rapidly rotated.

Means are provided for manually moving the point of the pawl 30 outwardly to constantly engage one of the ratchet teeth 36 and to retain the pawl 30 in its tooth engaging and belt retaining position.

Extending axially within an opening at the end of the arbor 14 adjacent the pawl 30 is a slidable member 38 the inner end of which is reduced in diameter. In the position of the member 38 shown in FIG. 3, its reduced end bears against the surface of the pawl 30 with the pawl in retracted position. Movement inward of member 38 causes the larger diameter of this member to move the pawl 30 outward into locking engagement with one of the ratchet teeth 36.

To effect movement manually of member 38 a rod 40 supported rotatably in suitable bearings in the housing 10 has its outwardly bent central portion passing through a transverse hole in the member 38. Rotary movement of the rod 40 within its bearing forces the member 38 inward. In this inward position of the member 38 its portion of large diameter will contact and rotate the pawl 30 radially outward about its pivot 32. To move the rod 40 to actuate the member 38 a handle or knob 42 may be provided secured as shown to the upper end of rod 40.

When the belt 12 described above is installed in a car its portions may be buckled together after withdrawing the belt portion from its housing. Slowly withdrawing the belt portion from its housing does not rotate the arbor 14 fast enough to oscillate the pawl 30 for the point of the pawl to engage with one of the ratchet teeth 36. However, a sudden stopping of the car so rapidly withdraws the belt that the arbor 30 is rotated fast enough to force the pawl centrifugally outward to engage one of the teeth and thus prevent further withdrawal of the belt.

I claim as my invention:

A safety belt for automobiles comprising, a housing adapted for attachment to an automobile, a rotatable arbor supported therein, a belt having one end attached to said arbor, a spring normally forcing said belt toward its retracted position about said arbor, a series of ratchet teeth formed within said housing disposed concentrically to the axis of said arbor, a pivotally mounted pawl member positioned within said arbor, whereby a rapid withdrawal of said belt will move said pawl outwardly into locking engagement with said ratchet teeth and prevent further withdrawal of said belt, and manually operable means to force said pawl outwardly and retain said pawl in its locking engagement with said ratchet teeth, said manually operative means comprising an axially movable member having portions of different diameter adapted to individually engage said pawl.

References Cited by the Examiner
UNITED STATES PATENTS

| | | | |
|---|---|---|---|
| 2,557,313 | 6/51 | Quilter | 297—386 |
| 2,708,555 | 5/55 | Heinemann et al. | 242—107.4 |
| 2,845,233 | 7/58 | Pfankuch et al. | 242—107.4 |
| 2,953,315 | 9/60 | Lautier et al. | 242—107.4 |
| 2,979,282 | 4/61 | Barecki | 242—107.4 |
| 3,074,761 | 1/63 | Ryan | 297—388 |

FRANK B. SHERRY, *Primary Examiner.*
RUSSELL C. MADER, *Examiner.*